United States Patent Office 2,888,442
Patented May 26, 1959

2,888,442

NEW POLYMERS FROM CONJUGATED DIENES AND POLYVINYL COMPOUNDS PREPARED IN THE PRESENCE OF MERCAPTANS

Carl A. Uraneck, Phillips, and Willard M. St. John, Jr., Borger, Tex., assignors to Phillips Petroleum Company, a corporation of Delaware No Drawing. Application April 9, 1954
Serial No. 422,254

20 Claims. (Cl. 260—79.3)

This invention relates to a polymeric material resulting from the copolymerization of a conjugated diene with a polyvinyl compound or monovinylacetylene in the presence of relatively large amounts of a modifying agent such as a mercaptan. In one of its aspects, this invention relates to a polymeric material comprising a copolymer of a conjugated diene and a polyvinyl compound or monovinylacetylene having a physical consistency ranging from readily flowing liquids to materials having a soft cheese-like consistency or a texture resembling art gum.

It is well known that rubbery products are obtained by the polymerization of conjugated dienes either alone or with materials copolymerizable therewith. A polymerization modifier such as a mercaptan is generally present in the system. Large amounts of mercaptan result in the formation of liquid polymers. It is also known that a polyvinyl compound such as divinylbenzene, when present in a polymerization system or when incorporated into a polymer subsequent to polymerization yields highly cross linked products which are resinous in character.

We have now discovered that new polymeric materials can be produced by the polymerization of one or more conjugated dienes with or without another type of copolymerizable material, if such polymerization is effected in the presence of both a cross linking compound such as a polyvinyl compound or monovinylacetylene and a relatively large quantity of a modifier such as a mercaptan. High conversion, gel free polymers, ranging from liquids to materials resembling art gum in texture, i.e., polymers which crumble easily, can be readily produced as well as materials having a similar consistency but containing variable amounts of gel. That is intermediate products resembling petroleum jelly or cup-grease in consistency but not necessarily having lubricating properties are obtained. The amount of gel can be regulated by adjusting the ratio of the cross linking compound to the modifier and by varying the quantities of each of these materials in the polymerization recipe. In these polymerization systems the cross linking compound enters into the polymerization and is, therefore, regarded as one of the monomers.

The polymers prepared in accordance with this invention do not have the properties of rubber. They are applicable for use in adhesive compositions, as a protective coating, as potting compounds, as softeners and extenders for rubbers, and in the manufacture of gaskets and other articles.

Our composition can be used either alone or compounded and cured depending upon whether a permanent set is desired or not. The grease-like material is particularly adapted as a protective coating material. The uncompounded liquid or grease-like material is useful as a temporary protective coating for metal parts. The coating can be easily removed by wiping. On the other hand, if a permanent coating is desired, compounding ingredient will be incorporated in the copolymer. When compounding is desired, the copolymeric material will generally be compounded with a vulcanizing agent, an accelerator, and an accelerator-activator. Other compounding ingredients can be used if desired such as antioxidants, modifiers, plasticizers, etc. After applying the compounded material, it can be cured (set) by the application of heat. The time of curing is generally a function of temperature and varies directly therewith. However, our invention relates to a new polymeric material which, among its other uses, is suitable for compounding. It is within the skill of the art to select the proper or desired compounding ingredients from the host of materials available. Some of these materials are indicated below.

Many accelerators are known to those skilled in the art and any of these accelerators can be used. Examples of these include 2-mercaptothiazoline, formaldehyde, p-toluidine, mixed diarylguanidine, piperidine pentamethylene dithiocarbamate, benzothiazyl disulfide, zinc dibenzyl dithiocarbamate, zinc dibutyl dithiocarbamate, zinc diethyl dithiocarbamate, 2-mercaptobenzothiazole, dibutyl xanthogen disulfide, diphenylguanidine, tetramethyl thiuram disulfide, and many others.

There are many accelerator-activators known in the art. Examples of such compounds include lead oxide, zinc oxide, magnesium oxide, mixture of magnesium oxide and carbon, lead carbonate, hydrated lime, lead silicate, dibutyl ammonium oleate, oleic acid, dibenzylamine, oleic acid, linseed oil fatty acids, rosin acids, triethanolamine, zinc stearate, etc.

The vulcanizing agents are also well known in the art and include sulfur, p,p'-dibenzoylquinonedioxine, p-quinonedioxine, magnesium oxide, sulfur dichloride, sulfur monochloride, alkyl phenol monosulfide, alkyl phenol disulfide, etc. Many of the accelerator-activators also function as vulcanizing agents, for example, litharge, red lead, lead silicate, etc.

The antioxidants which are also well known in the art include hydroquinone monobenzyl ether, phenyl-beta-naphthylamine, polymerized trimethyldihydroquinoline, heptylated diphenylamine, glycerol monoester of salicyclic acid, hexachloronaphthalene, poly diaryl amine, hydrocarbon waxes, etc.

Typical modifiers will be mentioned in connection with preparation of the liquid copolymeric material.

The polymers prepared by the method of this invention are different from those prepared by known methods. They are particularly adaptable as potting compounds since, not being rubbers, they conform readily to the shape of the containing vessel and being substantially non-drying, do not undergo chemical change in the presence of air or other oxygen-containing gases. Furthermore, their very low temperature-viscosity coefficient makes it possible to select a material of the desired properties and utilize it under widely ranging conditions of temperature without substantial change in viscosity.

An object of this invention is to provide a new polymeric material comprised of a conjugated diene and a cross linking compound. Another object of this invention is to provide a new polymeric material having properties especially suited to potting compounds. Other objects and advantages will be obvious to those skilled in the art upon reading this disclosure and the attached claims.

Conjugated dienes employed in the production of the polymers herein described are preferably those which contain four to six, inclusive, carbon atoms per molecule but those containing more carbon atoms per molecule, e.g. eight can also be used. These compounds include 1,3-butadiene, isoprene, piperylene, methylpentadiene, 2,3-dimethyl-1,3-butadiene, 2,3-diethyl-1,3-butadiene, haloprenes such as chloroprene, methylchloroprene and others. Furthermore, various alkoxy, such as methoxy and ethoxy, and cyano derivatives of these conjugated dienes are applicable, i.e., 2-methoxybutadiene and 1-cyanobutadiene.

Materials which are copolymerizable with conjugated dienes include styrene, alpha-methylstyrene, various alkyl-substituted styrenes, vinylnaphthalene, acrylic acid, methacrylic acid, methylacrylate, ethyl acrylate, methyl alphachloroacrylate, methyl methacrylate, ethyl methacrylate, acrylonitrile, methacrylonitrile, methyl isopropenyl ketone, methyl vinyl ether, vinyl acetate, vinyl chloride, vinylidene chloride, vinylfurane, vinylcarbazole, triallyl-cyanurate, vinylpyridines, halogen-substituted styrenes, alkoxy-substituted styrenes, etc.

The polyvinyl compounds which are applicable in our invention are selected from the group consisting of polyvinyl aromatic compounds such as divinylbenzene, trivinylbenzenes, di(alpha-methylvinyl)benzenes, divinylnaphthalenes, trivinylnaphthalenes, divinyldiphenyls and wherein the ring can be further substituted with alkyl groups; divinyl sulfide; divinyl sulfone; divinyl ether; polyacrylate esters of polyhydric alcohols such as ethylene glycol, propylene glycol, butylene glycol, hexylene glycol, octylene glycol, glycerine, 1,2,4-trihydroxybutane, 1,2,6-trihydroxyhexane, 1,2,3,4-tetrahydroxybutane and the like. These compounds can be represented by the general formula:

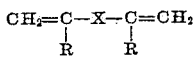

where R is H or $CH_3$ and X is selected from the group consisting of:

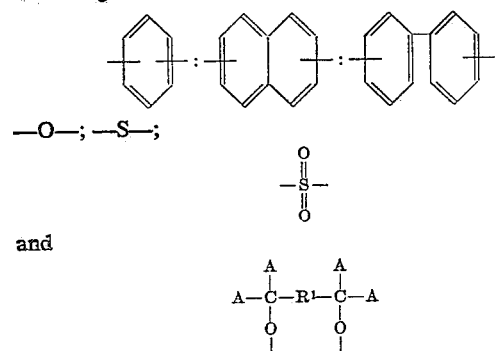

A is H, hydroxyalkyl or alkyl group of 1 to 6 carbon atoms and $R^1$ is a carbon to carbon linkage or an alkylene group containing 1 to 8 carbon atoms which can be substituted, and where substituted, the substituent will generally be hydroxy or acryloxy groups. Where X is an aromatic radical it may be alkyl or alkenyl substituted.

We have found that the polyvinyl aromatics and monovinylacetylene are of particular value as the crosslinking monomer. These compounds are well known in the arts and are easily and readily prepared commercially.

In the polymerization of our process, the conjugated diene is employed in amounts in the range between 1 and 99 parts by weight per 100 parts total monomeric material, including the cross linking compound. The amount of cross linking compound employed is in the range between 1 and 10 parts by weight per 100 parts total monomeric material.

While any modifying agent known to the art can be used without departing from the scope of this invention, the modifying agents most generally used are sulfur containing compounds such as mercaptans, organic sulfides, thio and dithioic acids and salts, xanthogenic acids and salts, thio-carbamic acids and salts and the like. However, the aryl and alkyl mercaptan are most generally used as modifiers in emulsion systems and we have found that tertiary aliphatic $C_{12}$ to $C_{16}$ mercaptans are of particular value. The mercaptans used will generally contain 3–16 carbon atoms per molecule. Mixtures or blends of mercaptans are also used, the amount of mercaptan employed will be dependent upon the particular mercaptan or blend, the operating temperature, the monomer materials employed, etc. The amount of modifier employed is in the range between 5 and 50 parts by weight per 100 parts total monomeric material.

The system most widely used and especially adapted for polymerization or copolymerization of conjugated dienes, and polyvinyl compounds in the presence of a modifier such as a mercaptan is emulsion polymerization. However, the production of the polymer as described herein by other polymerization systems is within the scope of this invention.

In effecting one form of such aqueous emulsion polymerization, particularly when a batch-type of semibatch-type operation is carried out, the reactor is usually first charged with an aqueous medium which contains the desired emulsifying agent, and the monomeric material. An activator solution and an oxidant are separately added to the reaction mixture and the reaction proceeds. A preferred manner of adding those two latter constituents has been usually to have the activator solution incorporated in an aqueous medium prior to addition of the monomeric material, and then to add the oxidant as the last ingredient. It is also sometimes the practice to add portions of one or the other of the activator solutions and oxidant intermittently, or continuously during the course of the reaction. If the operation is carried out continuously, streams of the various ingredients are admixed in somewhat the same order prior to their final introduction into the polymerization zone.

The emulsifying agents employed in emulsion polymerization systems include alkali metal alkyl aryl sulfonates such as sodium and potassium alkylbenzene and alkyltoluene sulfonates; sulfates of long-chain aliphatic alcohols such as sodium lauryl sulfates; water soluble acid salts of organic bases containing a hydrocarbon chain of 8 to 24 carbon atoms, e.g. hydrochloric, sulfonic, formic, and acetic acid salts of primary, secondary, and tertiary amines such as octylamines, dodecylamines, octadecylamines, and octadecenylamines; quaternary ammonium salts such as cetyl trimethyl ammonium bromides, and the like; the alkali metal and ammonium salts of fatty acids, such as sodium oleate, sodium stearate, sodium laurate, sodium myristate, sodium palmitate, the corresponding potassium salts and the like ammonium salts; the ammonium and alkali metal salts of rosin acids such as the ammonium, sodium and potassium salts of abietic acid, dihydroabietic acid, and tetrahydroabietic acid; and non-ionic emulsifying agents such as the addition products of mercaptan ethylene oxide and the like. The amount of emulsifier used will be dependent upon the particular monomer, the amount of aqueous phase, etc. In general with a recipe using 150 to 350 parts by weight water per 100 parts of monomer, 1 to 10 parts of emulsifier is used.

The following recipes are given as examples of some of the types of polymerization recipes that can be used in accordance with our invention, and are presented as being typical of those to which our invention is applied.

RECIPE

| Diazothioether | Iron Pyrophosphate (Redox) | Polyalkylene Polyamine |
|---|---|---|
| Monomer. Water. Modifier. Emulsifier. Diazothioether. | Monomer. Water. Modifier. Hydroperoxide. Emulsifier. Sugar (optional). Alkali-metal pyrophosphate. $FeSO_4 \cdot 7H_2O$ | Monomer. Water. Electrolyte (optional). Alkali metal hydroxide (optional). Emulsifier. Modifier. Hydroperoxide. Polyalkylene polyamine. |

Suitable hydroperoxides for use in iron pyrophosphate (redox) and polyalkylene polyamine recipes and other recipes calling for an oxygen-yielding material are preferably organic hydroperoxides having the formula

RR'R"COOH wherein each of R, R', and R" is an organic radical, or R'R" together comprise a tetramethylene or pentamethylene group forming with the R—COOH a cyclopentyl or cyclohexyl hydroperoxide. Each of R, R' and R" can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether groups, sulfur in similar groups (i.e., mercapto compounds and thioethers), and halogen compounds. Examples of such hydroperoxides include diisopropyl hydroperoxide (isopropyl(dimethyl)-hydroperoxymethane), cumene hydroperoxide [phenyl-(dimethyl)hydroperoxymethane], 1-methyl-1-hydroperoxycyclopentane, tetralin hydroperoxide, phenylcyclohexane hydroperoxide, octahydrophenanthrene hydroperoxide, diisopropylbenzene hydroperoxide [dimethyl(isopropylphenyl)hydroperoxymethane], methylethyl(ethoxyphenyl)hydroperoxymethane, methyldecyl(methylphenyl)hydroperoxymethane, dimethyldecylhydroperoxymethane, methyl(chlorophenyl)phenylhydroperoxymethane, and tertiary-butylisopropylbenzene hydroperoxide [dimethyl(tertiary-butylphenyl)hydroperoxymethane].

The amount of hydroperoxide used to obtain an optimum reaction rate will depend upon the other reaction conditions, and particularly upon the type of polymerization recipe used. The amount is generally expressed in millimols per 100 parts of monomeric material, using in each instance the same units of weight throughout, i.e., when the monomeric material is measured in pounds the hydroperoxide is measured in millipound mols. The same is true for other ingredients of the polymerization recipe. An optimum rate of polymerization is usually obtained with the amount of hydroperoxide between 0.1 and 10 millimols per 100 parts by weight of monomeric material. The hydroperoxide can frequently be easily separated from accompanying materials by converting it to a corresponding salt of an alkali metal, which is usually a crystalline material in a pure or concentrated state at atmospheric temperatures, and separating the salt. This salt can be used as an active form of the hydroperoxide.

In case of a diazothioether recipe, preferably diazothioethers have the formula R—N=N=S—R' where R and R' are aromatic groups containing substituents such as alkyl, chloro, nitro, methoxy, sulfonic acid group, and R' can also be cycloalkyl, substituted cycloalkyl, aliphatic and substituted aliphatic, and the like. These compounds act both as initiators and as modifiers in a polymerization recipe and hence may be used as both catalysts and modifiers in the recipe. However, it is preferred to use a mercaptan modifier along with the diazothioether in the practice of our invention. It is often desirable to use a catalyst such as potassium or sodium ferricyanide in conjunction with the diazothioether, in an amount such as between 0.03 and 1.0 part by weight per 100 parts by weight of monomeric material. Examples of suitable diazothioethers include 2-(2,4-dimethylbenzenediazomercapto)naphthalene, 2(4-methoxybenzenediazomercapto)naphthalene (known in the art as MDN), 2-(2-methylbenzenediazomercapto)naphthalene, 2-(2,5-dimethoxybenzenediazomercapto)naphthalene, 4-(2,5-dimethoxybenzenediazomercapto)toluene, 4-(2-naphthalenediazomercapto)anisole, 2-(4-acetylaminobenzenediazomercapto)naphthalene, 2-(benzenediazomercapto)-naphthalene, 2-(4-sulfobenzenediazomercapto)benzothiazole, 2-(1-naphthalenediazomercapto)naphthalene, 2-(4-chlorobenzenediazomercapto)naphthalene, 2-(5-quinolinediazomercapto)naphthalene, 2-(4-nitrobenzenediazomercapto)naphthalene, and the like.

The type and amount of diazothioether used in a particular polymerization recipe depends upon the result desired. In general, approximately 0.2 part by weight of diazothioether per 100 parts of butadiene will give satisfactory promotion of the polymerization reaction although other proportions within the range of about 0.5 to about 5.0 parts by weight per 100 parts by weight of butadiene, can be used.

In the case of a polyalkylene polyamine recipe, the activating agent, i.e., a polyalkylene polyamine is preferably a polyethylene polyamine or a trimethylene polyamine. Suitable polyethylene polyamines have the general formula RNH(CHXCHXNH)$_m$(CHXCHX)$_n$NHR, where R contains not more than eight carbon atoms and is of the group consisting of hydrogen, alkyl, cycloalkyl, aromatic, olefinic, and cycloolefinic radicals, each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and R can be of mixed character when containing six or more carbon atoms, such as alkylcycloalkyl, aralkyl, alkaryl groups, and the like, and both R and X can also have non-hydrocarbon substituents; particularly useful non-hydrocarbon constituents include oxygen in the form of hydroxy and ether compounds, sulfur in similar compounds (i.e., mercapto compounds and thioethers), and halogen compounds. Examples of such polyethylene polyamines include ethylenediamine, hydrazine, diethylenetriamine, tetra-ethylenepentamine, di(methylethylene)triamine, N-(2-hydroxyethyl)-1,2-ethanediamine, N-phenylethylenediamine, N-cyclohexyl-N'-(2-aminoethyl)-1,2-ethanediamine, N-(2-hydroxy-tertiary-butyl)-1,2-propanediamine, carbamates of the foregoing, and the like.

Suitable trimethylene polyamines are preferably those having the general formula

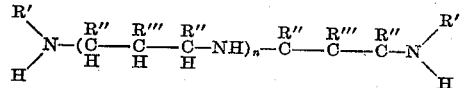

where each R' is one of the group consisting of hydrogen, methyl, ethyl, hydroxymethyl, hydroxyethyl, and carboxy radicals, each R" is hydrogen or methyl, and each R''' is hydrogen, methyl, or an activating substitutent of the group consisting of —OR, —SR, —NR$_2$, —CN, —SCN, —COOR, —CHO, with R being hydrogen, methyl, ethyl, n-propyl, or isopropyl or —CHR''' can be C=O, and $n$ is an integer between 0 and 8, inclusive. The compounds containing a single trimethylene group together with its two terminal amino groups is preferred. The simplest of these trimethylene polyamines, or 1,3-diaminopropanes, is 1,3-diaminopropane itself. This compound is also known as trimethylenediamine. Substitution of an —OH or a =O on the central carbon atom of 1,3-diaminopropane appears to enhance the activity in the emulsion polymerization recipes, hence 1,3-diaminoacetone and 1,3-diamino-2-propanol are at present the most preferred 1,3-diaminopropanes. Other 1,3-diaminopropanes, which contain a plurality of trimethylene (unsubstituted or substituted) groups alternating with amino groups, and which are regarded as polymers of the parent compounds, can also be employed; for example tri(trimethylene)tetramine (sometimes erroneously designated as tripropylenetetramine) is considered to be a polymer of trimethylenediamine. All of the polyamino compounds referred to above have the basic structure of 1,3-diaminopropane and hence can be broadly referred to as "1,3-diaminopropane and its derivatives and polymers thereof"; they can also be broadly referred to as "1,3-diaminopropanes" and also as "trimethylene polyamines." It is preferred to use only those polyamines which come within the structural formula defined hereinabove, and all of the compounds so defined are operable in our process to some extent though it will be of course appreciated that the relative activities and efficacies will vary considerably depending upon the size of the molecule and the various constituents thereof, as well as upon the other components and their proportions in the various recipes which may be used. Those skilled in the art will readily ascertain any of the specific compounds which are within the scope of the structural formula. However, by way of example the following are mentioned: 1,3 - diaminopropane, 1,3 - diaminoacetone, 1,3-diamino-2-propanol, N,N'-dimethyl-1,3-diaminoacetone, N-ethoxy-1,3-diamino-2-propanol, 1,3-diamino - 2 - carboxypropane, 1,3 - diamino - 2 - (dimethylamino)-propane, 2,4-diaminopentane, 1,3-diamino-2-cyanopropane, 1,3-diamino-2-mercaptopropane, di(trimethylene)triamine, tri(trimethylene)tetramine, tetra(trimethylene) pentamine, polytrimethylene polyamines in which the amino and trimethylene groups can be substituted as previously mentioned, and carbamates of each of the foregoing.

These polyalkylene polyamine activator compositions appear to serve as reductants and/or activators in the polymerization mixture, and no other activating ingredients, such as compounds of polyvalent-multivalent metals, need be added in order to obtain satisfactory and rapid polymerization of the butadiene, except as such compounds may fortuitously be present as traces in the polymerization mixture. Similarly, no other reducing ingredient, such as a reducing sugar, need be added.

The amount of polyalkylene polyamine to be used in any particular case depends upon such variables as the polyamine used, specific ingredients of recipe, and conditions of reaction. In general, amounts of polyalkylene polyamine in the range of 0.1 to 2 parts of polyalkylene polyamine per 100 parts of butadiene will give satisfactory results; however greater or smaller amounts of polyamine can be used.

We will further describe our invention by use of the following examples wherein butadiene is copolymerized in the presence of a crosslinking compound and relatively large amount of a mercaptan. The products are evaluated.

*Example I*

A butadiene/divinylbenzene copolymer was prepared by emulsion polymerization at 41 F. in accordance with the following recipe:

| | Parts by weight |
|---|---|
| Butadiene | 95 |
| Divinylbenzene | 5 |
| Water | 200 |
| Potassium fatty acid soap | 5 |
| Tert-butylisopropylbenzene hydroperoxide, 17.9 percent | 1.28 |
| Tert-dodecyl mercaptan | 20 |
| $FeSO_4 \cdot 7H_2O$ | 0.278 |
| $K_4P_2O_7$ | 0.33 |

The reaction was shortstopped with 0.2 part di-tert-butylhydroquinone, based on monomers, and 2 parts phenyl-beta-naphthylamine, based on rubber polymer, was added as the antioxidant. A monomer conversion of 82 percent in 16 hours was obtained. The product was a semi-solid crumb which contained 70 percent gel.

Blends of the butadiene/divinylbenzene copolymer with a butadiene/acrylonitrile rubber (Paracril B) and also with a 41 F. 75/25 butadiene/styrene rubber (Mooney value approximately 52) were prepared and evaluated. Evaluation data were also obtained on a sample of the butadiene/acrylonitrile rubber alone. The compounding recipes were as follows:

| | Parts by Weight | | | | |
|---|---|---|---|---|---|
| | 1 | 2 | 3 | 4 | 5 |
| Butadiene/divinylbenzene copolymer | 25 | 50 | 75 | 50 | |
| Paracril B | 75 | 50 | 25 | | 100 |
| Butadiene/styrene rubber | | | | 50 | |
| Carbon Black (Philblack A) | 60 | 60 | 60 | 60 | 60 |
| Zinc oxide | 5 | 5 | 5 | 5 | 5 |
| Stearic acid | 1.5 | 1.5 | 1.5 | 1.5 | 1.5 |
| Sulfur | 1.5 | 1.5 | 1.5 | 1.5 | 1.5 |
| Altax (benzothiazyl disulfide) | 1.5 | 1.5 | 1.5 | 1.5 | 1.5 |

The samples were milled, cured 45 minutes at 307 F., and physical properties determined. The following results were obtained.

| | Sample No. | | | | |
|---|---|---|---|---|---|
| | 1 | 2 | 3 | 4 | 5 |
| 212 F. Compression set, percent | 8.5 | 9.6 | 11.1 | 11.8 | 8.0 |
| Tensile, p.s.i., 80 F. | 2,150 | 1,280 | 610 | 1,480 | 3,090 |
| Elongation, percent, 80 F. | 235 | 150 | 60 | 160 | 330 |
| Tensile, p.s.i., oven aged 24 hrs. at 212 F. | 2,340 | 1,540 | 800 | 1,510 | 2,250 |
| Elongation, percent, oven aged 24 hrs. at 212 F. | 210 | 135 | 55 | 135 | 210 |
| Swelled, percent [1] | 50.5 | 60.0 | 67.0 | 108.5 | 45.6 |
| Extracted, percent [1] | 4.7 | 7.6 | 10.4 | 10.7 | 2.6 |
| Shore Hardness | 71.5 | 74.5 | 77.0 | 70.5 | 68.5 |
| Compounded MS 1½ | 52.5 | 43.5 | 37.0 | 42 | 55.5 |
| Freeze point, T-R, C | −30 | −34 | | −56 | −28 |
| Freeze point, Gehman, C | −34 | −34 | −46 | −57 | −30 |
| Cold Compression set: | | | | | |
| Relaxed 10 sec., percent | 98.3 | 97.5 | 96.7 | 83.8 | 97.1 |
| Relaxed 30 min., percent | 97.7 | 96.4 | 88.9 | 55.0 | 97.0 |

[1] Swelling and extraction determinations were made following 48 hours' immersion at 158 F. in 70/30 isooctane/toluene mixture.

The above example shows how the copolymer can be compounded with a rubber in a typical gasket stock. Softeners for Paracril rubbers are desired that lower the compound Mooney, lower the freeze point and improve the swell resistance. From the above table it can be seen that the copolymer helped in all of these qualities.

*Example II*

Several butadiene/divinylbenzene and butadiene/monovinylacetylene copolymers were prepared by emulsion polymerization at 41 F. in accordance with the following recipes:

| | Parts by Weight | | | | |
|---|---|---|---|---|---|
| | 1 | 2 | 3 | 4 | 5 |
| Butadiene | 95 | 95 | 95 | 95 | 99 |
| Divinylbenzene | 5 | | 1 | 5 | 1 |
| Monovinylacetylene | | 5 | | | |
| Water | 250 | 250 | 250 | 200 | 250 |
| Potassium fatty acid soap | 7.5 | 7.5 | 7.5 | 5 | 7.5 |
| Tert-dodecyl mercaptan | 30 | 15 | 5 | 20 | 20 |
| Cumene hydroperoxide, 100% | 0.084 | 0.084 | 0.084 | | 0.084 |
| Tert-butylisopropylbenzene hydroperoxide, 17.9% | | | | 1.28 | |
| $FeSO_4 \cdot 7H_2O$ | 0.139 | 0.139 | 0.139 | 0.278 | 0.139 |
| $K_4P_2O_7$ | 0.165 | 0.165 | 0.165 | 0.33 | 0.165 |
| KCl | 0.2 | 0.2 | 0.2 | | 0.2 |
| Di-tert-butylhydroquinone, p.h.m.[1] | 0.3 | 0.3 | 0.3 | 0.2 | 0.3 |
| Phenyl-beta-naphthylamine, percent [2] | 1.31 | 1.08 | 1.46 | 1.36 | 1.22 |
| Polymerization time, hours | 28.3 | 28.0 | 25.7 | 16 | 27.8 |

RESULTS

| | Parts by weight | | | | |
|---|---|---|---|---|---|
| | 1 | 2 | 3 | 4 | 5 |
| Conversion, percent | 86 | 81 | 86 | 82 | 82 |
| Inherent viscosity, original | 1.44 | 0.38 | 1.05 | 0.20 | 0.37 |
| Inherent viscosity, milled 3 passes | 1.39 | 0.52 | 0.83 | 0.21 | 0.34 |
| Gel, percent, original | 0 | 18 | 0 | 70 | 0 |
| Gel, percent, milled 3 passes | 0 | 2 | 0 | 55 | 0 |
| Refractive index | 1.5181 | 1.5151 | 1.5147 | | 1.5148 |
| Total sulfur, percent | 2.75 | 1.63 | 0.60 | | 1.95 |
| Description of product | grease-like consistency | jelly; soft and sticky | jelly; soft and sticky | semi-solid crumb | viscous liquid |

[1] Shortstop, parts per 100 parts monomers.
[2] Antioxidant, percent based on rubber.

Each of the copolymers (1–5) and also a butadiene/acrylonitrile rubber (Paracril B) were compounded in accordance with the following formulations:

| | Butadiene/Divinylbenzene or Butadiene/Monovinylacetylene Copolymer | Paracril B |
|---|---|---|
| Copolymer or Paracril B | 100 | 100 |
| Carbon black | variable | 60 |
| Zinc oxide | 5 | 5 |
| Stearic acid | 1.5 | 1.5 |
| Sulfur | 4.0 | 1.5 |
| Altax (benzothiazyl disulfide) | 2.5 | 1.5 |
| TP-90B (dibutyl carbitol formal) | | 10 |

The samples were milled, cured 30 minutes at 307 F. and cold compression set values determined. See ASTM Bulletin, May 1953, p. 43, for details of method. Results were as follows:

| Copolymer Sample No. | Carbon black Parts [1] | Cold Compression Set | |
|---|---|---|---|
| | | Relaxed 10 sec., percent | Relaxed 30 min., percent |
| 1 | 95 | 83.7 | 76.9 |
| 2 | 95 | 85.2 | 76.1 |
| 3 | 80 | 91.3 | 86.8 |
| 4 | 60 | 64.4 | 34.4 |
| 5 | 95 | 91.5 | 91.1 |
| Paracril B | 60 | 96.8 | 74.2 |

[1] Parts per 100 parts polymer.

The above example shows two things. First, the physical properties of the copolymer can be varied by varying the percent cross linking compound and/or the modifier. Secondly, when the copolymer is compounded and cured, its physical properties will vary depending upon the particular copolymer, as is shown by the cold compression set. For example, sample 4 containing 5 percent divinyl benzene in the copolymer had a cold compression set comparing favorably with the best of synthetic rubbers.

*Example III*

The following 41 F. polymerization recipe was used for the preparation of a series of polymers:

| | Parts by weight |
|---|---|
| Monomer | 100 |
| Water | 250 |
| Potassium fatty acid soap | 7.5 |
| Tert-dodecyl mercaptan | 30 |
| KCl | 0.2 |
| Cumene hydroperoxide | 0.084 |
| $FeSO_4 \cdot 7H_2O$ | 0.139 |
| $K_4P_2O_7$ | 0.165 |

Results were as follows:

| Monomers, Parts | | | Time, Hours | Conversion, Percent | Physical Appearance |
|---|---|---|---|---|---|
| Butadiene | Divinylbenzene | Other Monomer | | | |
| 70 | 5 | 25 Acrylonitrile | 17.5 | 82 | grease-like. |
| 70 | 5 | 25 Ethyl acrylate | 17.5 | 80 | fluid. |
| 70 | 5 | 25 Styrene | 17.5 | 67 | grease-like. |
| 70 | 5 | 25 2-Methyl-5-Vinylpyridine | 17.5 | 91 | semi-fluid. |
| 70 | 5 | 25 Beta-vinylnaphthalene | 43.6 | 60 | grease-like. |
| 70 | 5 | 25 Vinylidene chloride | 43.6 | 61 | plastic; very slow flow. |
| 70 | 5 | 25 Triallylcyanurate | 43.6 | 61 | fluid. |
| 90 | 10 | | 17.6 | 63 | grease-like. |

The above example illustrates how the copolymer can be made to vary from a plastic through a grease-like material to fluid.

We have described our product in terms of butadiene-1,3, one of the more abundant conjugated dienes and divinylbenzene or vinylacetylene. However, we are not limited to these materials or the proportions used but our invention is equally applicable to a product of polymerization of any of the conjugated dienes disclosed polymerized or copolymerized in the presence of any of the cross linking compounds as disclosed and in the presence of large amounts of modifier as has been disclosed.

We claim:

1. A composition of matter comprising the copolymerized product of (A) 90 to 99 parts by weight per 100 parts monomeric material of at least 75 parts 1,3-butadiene and acrylonitrile, and (B) 1 to 10 parts by weight per 100 parts monomeric material of divinylbenzene, the said copolymer having been formed by emulsion polymerization in the presence of 5 to 50 parts by weight of a mercaptan per 100 parts copolymer.

2. A composition of matter comprising the copolymerized product of (A) 90 to 99 parts by weight per 100 parts monomeric material of at least 75 parts 1,3-butadiene and ethyl acrylate, and (B) 1 to 10 parts by weight per 100 parts monomeric material of divinylbenzene, the said copolymer having been formed by emulsion polymerization in the presence of 5 to 50 parts by weight of a mercaptan per 100 parts copolymer.

3. A composition of matter comprising the copolymerized product of (A) 90 to 99 parts by weight per 100 parts monomeric material of at least 75 parts 1,3-butadiene and styrene, and (B) 1 to 10 parts by weight per 100 parts monomeric material of divinylbenzene, the said copolymer having been formed by emulsion polymerization in the presence of 5 to 50 parts by weight of a mercaptan per 100 parts copolymer.

4. A composition of matter comprising the copolymerized product of (A) 90 to 99 parts by weight per 100 parts monomeric material of at least 75 parts 1,3-butadiene and 2-methyl-5-vinylpyridine, and (B) 1 to 10 parts by weight per 100 parts monomeric material of divinylbenzene, the said copolymer having been formed by emulsion polymerization in the presence of 5 to 50 parts by weight of a mercaptan per 100 parts copolymer.

5. A composition of matter comprising the copolymerized product of (A) 90 to 99 parts by weight per 100 parts monomeric material of at least 75 parts 1,3-butadiene and vinylidene chloride, and (B) 1 to 10 parts by weight per 100 parts monomeric material of divinylbenzene, the said copolymer having been formed by emulsion polymerization in the presence of 5 to 50 parts by weight of a mercaptan per 100 parts copolymer.

6. A composition of matter comprising a copolymer of 75 to 99 parts by weight per 100 parts monomeric material of a conjugated diene of 4 to 6 carbon atoms, 1 to 10 parts by weight of a cross-linking compound selected from the group consisting of polyvinyl aromatic hydrocarbons, divinyl sulfide, divinyl sulfone, divinyl ether, polyacrylate esters of polyhydric alcohols and monovinyl acetylene, and 0 to 24 weight parts of a monomer selected from the group consisting of acrylonitrile, ethyl acrylate, styrene, 2-methyl-5-vinylpyridine, beta-vinylnaphthalene, vinylidene chloride and triallylcyanurate, the said copolymer having been formed by emulsion polymerization in the presence of 5 to 50 parts by weight of a mercaptan per 100 parts monomer.

7. The composition of matter of claim 6 wherein the mercaptan comprises tertiary aliphatic $C_{12}$ to $C_{16}$ mercaptans.

8. The composition of matter of claim 7 wherein the crosslinking compound is monovinylacetylene.

9. The composition of matter in claim 7 wherein the crosslinking compound is divinylbenzene.

10. The composition of matter of claim 7 wherein the crosslinking compound is trivinylbenzene.

11. The process comprising aqueous emulsion polymerization of monomeric material comprising 75 to 99 parts by weight per 100 parts total monomeric material of butadiene, 1 to 10 parts by weight of a crosslinking compound selected from the group consisting of polyvinyl aromatic hydrocarbons, divinyl sulfide, divinyl sulfone, divinyl ether, polyacrylate esters of polyhydric alcohols and monovinylacetylene and 0 to 24 weight parts of a monomeric material selected from the group consisting of acrylonitrile, ethylacrylate, styrene, 2-methyl-5-vinylpyridine, beta-vinylnaphthalene, vinylidene chloride and triallylcyanurate, said polymerization being in the presence of 5 to 50 parts by weight per 100 parts of monomer of a mercaptan.

12. The process of claim 11 wherein the polymerization is carried out at a temperature in the range —40 to 160° F.

13. The process of claim 12 wherein the mercaptan is a tertiary aliphatic mercaptan.

14. The process of claim 13 wherein the crosslinking compound is monovinylacetylene.

15. The process of claim 13 wherein the crosslinking compound is a polyvinyl aromatic hydrocarbon.

16. The process of claim 15 wherein the polyvinyl aromatic hydrocarbon is divinylbenzene.

17. The process of claim 15 wherein the polyvinyl aromatic hydrocarbon is trivinylbenzene.

18. The process of claim 15 wherein the polyvinyl aromatic hydrocrabon is di(alpha-methylvinyl)benzene.

19. The process of claim 15 wherein the polyvinyl aromatic hydrocarbon is trivinylnaphthalene.

20. The process of claim 15 wherein the polyvinyl aromatic hydrocarbon is divinylnaphthalene.

References Cited in the file of this patent

UNITED STATES PATENTS

| | | |
|---|---|---|
| 1,898,522 | Bock et al. | Feb. 21, 1933 |
| 1,938,751 | Meisenberg et al. | Dec. 12, 1933 |
| 2,234,204 | Starkweather et al. | Mar. 11, 1941 |
| 2,469,132 | Schulze et al. | May 3, 1949 |
| 2,474,807 | Schoene | July 5, 1949 |
| 2,677,674 | Daly | May 4, 1954 |
| 2,723,968 | Williams | Nov. 15, 1955 |

FOREIGN PATENTS

| | | |
|---|---|---|
| 562,269 | Great Britain | June 26, 1944 |